March 22, 1927. I. E. BOEKENOOGEN ET AL Re. 16,575

TOWING DEVICE

Original Filed Jan. 14, 1925

Inventors
I. E. Boekenoogen
E. R. Ames
by Bair & Freeman Attorneys

Reissued Mar. 22, 1927. Re. 16,575

UNITED STATES PATENT OFFICE.

ISAAC E. BOEKENOOGEN AND EARL R. AMES, OF AITKIN, MINNESOTA.

TOWING DEVICE.

Original No. 1,579,504, dated April 6, 1926, Serial No. 2,295, filed January 14, 1925. Application for reissue filed May 10, 1926. Serial No. 108,204.

Our invention relates to devices for use in towing motor vehicles.

It will be understood by those engaged in rescuing broken-down motor vehicles, that when the front end of the vehicle is broken down, this end is jacked up and the vehicle is towed front end forward with no difficulty, since the rear wheels follow along without sidewise turning or wobbling movement. But when the rear end of a motor vehicle is broken down, this end is jacked up and the vehicle is towed rear end forward.

On account of the manner in which the front wheels are mounted for steering purposes, they are free to wobble or swing from side to side with disastrous results unless such movement is restrained. It is not always convenient to have a driver in the car which is being towed in this manner, nor is it an easy matter for the driver, even if present, to control the towed car since he is facing backwardly.

An object therefore of our invention is to provide a device which will prevent the backwardly disposed front wheels from swinging movement on the axle when the motor vehicle is being towed rear end forward.

We accomplish this object by providing a device having a member adapted to fit upon and be firmly clamped to the front axle and another member adapted to fit upon and be firmly clamped to the steering knuckle arm tie rod, these two members being connected together so that when the device is in use, relative sidewise movement of the two members is prevented, thereby causing the wheels to follow straight ahead in the direction in which the motor vehicle is being towed.

Another object is to provide a device of this character, wherein the axle engaging member and the tie rod engaging member are pivotally connected together by a rod of substantial length, whereby the rod may extend at an angle from the axle receiving member and the tie rod receiving member for permitting the towing device to be used upon axles and tie rods of different distances apart and lock the tie rod against endwise movement relative to the axle.

In this connection, it may be mentioned that in many makes of automobiles, the tie rods and axles are spaced at different distances apart and in different horizontal planes.

Still another object is to provide a pair of members, one of which is adapted to be secured to an automobile axle, and the other to a tie rod, and a rod connection between said members having its ends pivotally connected to said members, whereby a substantially universal movement may be had of one member relative to the other for permitting the towing device to be connected to automobiles having their axles and tie rods spaced at different distances apart and in different positions relative to each other.

The full objects and advantages of our invention will appear in connection with the detailed description thereof and the novel features embodied in our inventive idea will be particularly pointed out in the claims.

In the accompanying drawings, which illustrate a practical embodiment of our invention, Figure 1 is a plan view showing the front axle and a portion of the steering mechanism of a motor vehicle with our device secured thereto.

Figure 1:
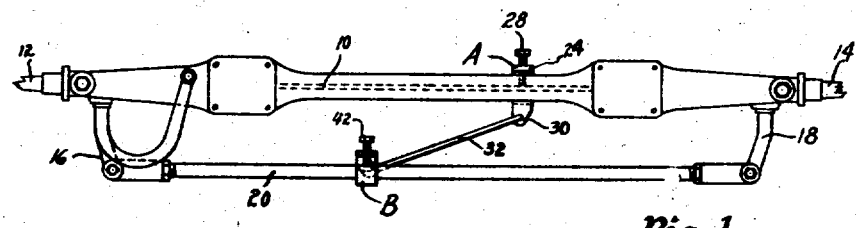

Referring to the drawings, a front axle 10 is shown provided with the customary swinging spindles 12 and 14 for receiving the front wheels, these spindles having secured thereto steering knuckle arms 16 and 18 connected by the tie rod 20.

It may be here mentioned that the customary tie rods 20 and front axles 10 are spaced at different distances apart upon different makes of automobiles, and in the accompanying drawings we have simply shown generally a front axle and a tie rod with our improved towing device connected thereto.

Referring now to our device, one end thereof consists of a member A having a base 22 from the ends of which flanges 24 and 26 extend upwardly. The member A may be termed the axle engaging unit or receiving member.

The flange 24 is provided with a screw-threaded hole adapted to receive the threads of a bolt 28. The flange 26 at its upper end is provided with a horizontal flange 30 which extends away from the two opposite sides thereof. This flange 30 is in alignment with the bolt 28 and the inner end of this flange is adapted to engage the side of the front axle 10 which is opposite the side thereof engaged by the bolt 28.

A rigid rod 32 is pivotally attached to the outer end of the flange 30, and this rod at its other end is pivotally attached to an eye 34 which extends downwardly from the base 36 of another member B of the device. The member B is designed to engage the tie rod 20, and may be termed the tie rod engaging unit or member.

Flanges 38 and 40 extend in a generally upward direction from the ends of the base 36 of the member B. The flange 38 is preferably outwardly inclined for a purpose which will presently appear, and this flange is provided with a screw-threaded hole to receive the threads of a bolt 42. The flange 40 is in general, V-shaped, with its lower portion inclined away from the base 36 and its upper portion inclined toward the flange 38 and provided at its upper extremity with a short portion 44 substantially parallel with the base 36. The apex of the V-shaped flange is disposed opposite the inner end of the bolt 42.

The operation and advantages of our invention will now be obvious.

Figure 2:
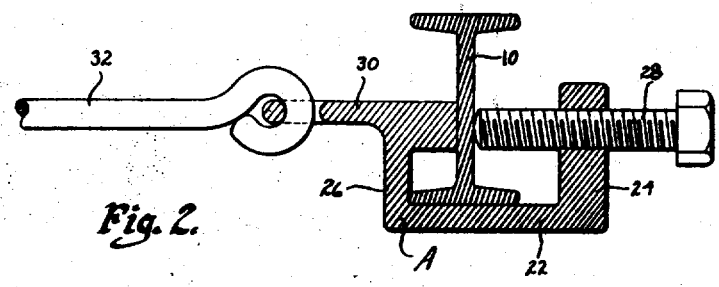
Figure 2 is a sectional view of one end of the device secured to the front axle.
Figure 3:
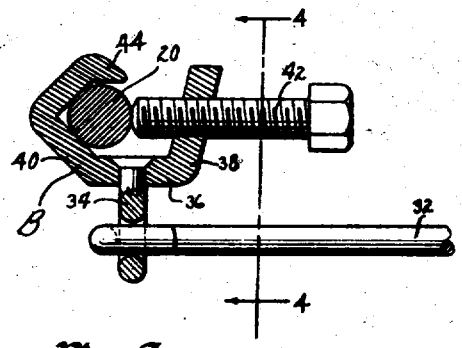
Figure 3 is a sectional view of the other end of the device secured to the steering knuckle arm tie rod.
Figure 4:
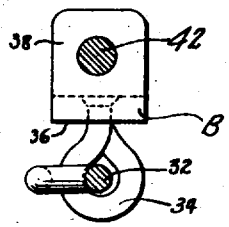
Figure 4 is a sectional view taken on the line 4—4 of Figure 3.

When the bolt 28 is partly unscrewed, the member by which it is carried may be readily slipped upon the front axle as will be understood from Figure 2. Upon screwing down the bolt 28, the said member will be firmly clamped in place on the front axle 10, which is shown in the form of an I-beam.

It will be obvious, however, that this member on account of the manner in which it is constructed, may be conveniently clamped upon axles having other shapes.

When the bolt 42 is partly unscrewed, the member will be firmly clamped in place on the tie rod. This result is accomplished when the tie rod is round on account of its engagement in the V-shaped flange 40. If the tie rod is square, the portion 42 and the base 36 engage opposite sides of the square rod, so that firm clamping engagement is effected.

Since the rod 32 is rigid and pivotally attached to the two end members of the device, and since the bolts 28 and 42 may be unscrewed to any desired extent, the device may be easily and quickly attached and detached for use with various makes of cars regardless of the size and shape of the front axle and tie rod and the distance between them.

When the members A and B are mounted upon the axle and tie rod respectively and connected together by the rigid tie rod 32, a rigid or immovable connection is formed between the tie rod and front axle, and this connection is of such nature as not to yield or give when the automobile is drawn in a straight line supported only upon the front steerable wheels thereof.

It is apparent that the present embodiment of the invention has been disclosed merely by way of example, and the numerous changes in the details of construction and in the combination and arrangement of parts may be resorted to without departing from the spirit or scope of the invention as hereinafter claimed or sacrificing any of its advantages.

Having thus described the invention, what we claim as new and desire to secure by Letters Patent is:—

1. A device for use in towing motor vehicles comprising an end member consisting of a base, a flange extending up from one end of said base, a bolt threaded through said flange, a second flange extending up from the other end of said base and a horizontal flange extending from the top of said second flange in alignment with said bolt, whereby said member is adapted to fit upon and be clamped to the front axle, a rod pivotally attached at one end to said member, a second end member consisting of a base to which the other end of said rod is pivotally attached, a flange extending up from one end of said base, a bolt threaded through said flange, and a second flange extending up from the other end of said base, said second flange being V-shaped, whereby said second member is adapted to fit upon and be clamped to the steering knuckle arm tie rod.

2. A device for use in towing motor vehicles comprising an end member consisting of a base, a flange extending up from one end of said base, a bolt threaded through said flange, a second flange extending up from the other end of said base and a horizontal flange extending from the top of said second flange in alignment with said bolt, whereby said member is adapted to fit upon and be clamped to the front axle, a rod pivotally attached at one end to said horizontal flange, a second end member consisting of a base, an eye carried by said base, to which the other end of said rod is pivotally attached, a flange extending up from one end of said base, a bolt threaded through said flange and a second flange extending up from the other end of said base, said second flange being V-shaped and having a short portion extending inwardly from its top in substantially parallel relation to said base, whereby said second member is adapted to fit upon and be clamped to the steering knuckle arm tie rod.

3. A towing device for automobiles comprising an axle engaging member adapted to be secured to an axle, a tie rod engaging member adapted to be secured to the tie rod, a rigid rod having eyes at each of its ends for permitting it to be loosely connected to said members, means of connection between said members and said eyes for allowing universal movement of the members relative to the rod, whereby the members may be adjusted and secured to axles and tie rods spaced in different horizontal planes and in different vertical planes, so that axles and tie rods of automobiles may be locked against relative endwise movement for permitting an automobile to be towed without steering movement of the steerable wheels, the steerable wheels only of the automobile riding upon the road.

4. A towing device for automobiles comprising an axle engaging member adapted to be secured to an axle, a tie rod engaging member adapted to be secured to the tie rod, a rigid rod having eyes at each of its ends, each of said members having an eye formed thereon for connection with the eyes on said rod for universal movement connections between said rod and said members, whereby axles and tie rods of different distances apart may be locked against relative endwise movement for permitting an automobile to be towed without steering movement of the front wheels.

5. A device attachable to automobiles of various makes and designs for rendering the steering axle thereof rigid for towing purposes, comprising two clamps attachable to various sizes and shapes of axles and rods with means normally exposed to readily tighten the clamps to and loosen them from said axles and steering rods respectively, and a rigid part having a universally flexible attachment to at least one of said clamps, the attachments being such that they will prevent substantial longitudinal movement of said rigid part relative to the clamps and thus prevent relative longitudinal movement between the axle and rod, but being sufficiently flexible to allow attachment between the steering rods and axles of widely different normal positions of axles and rods relatively to each other.

ISAAC E. BOEKENOOGEN.
EARL R. AMES.